July 27, 1937.    G. LEITHÄUSER    2,088,172
SCALE FOR RADIO APPARATUS
Filed July 18, 1935
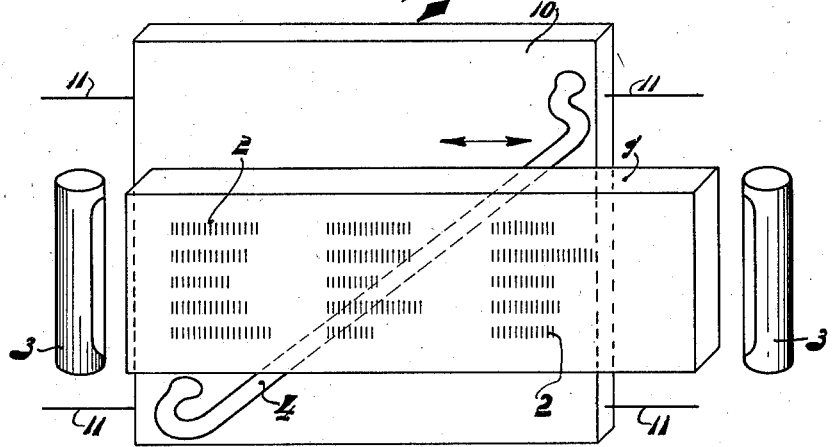
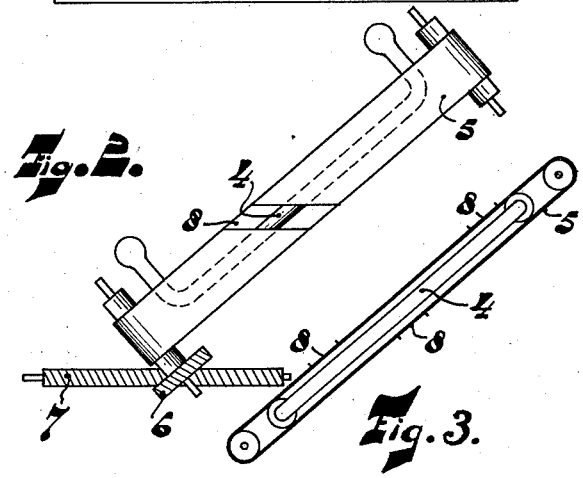
INVENTOR
GUSTAV LEITHAUSER
BY
ATTORNEY Patented July 27, 1937

2,088,172

UNITED STATES PATENT OFFICE 2,088,172

SCALE FOR RADIO APPARATUS

Gustav Leithäuser, Berlin, Germany, assignor to N. V. Philips' Gloeilampenfabrieken, Eindhoven, Netherlands Application July 18, 1935, Serial No. 31,989
In Germany July 21, 1934

5 Claims. (Cl. 116—124.1)

The present invention relates to a dial for wireless receiving sets or the like in which the tuning is effected in accordance with a given broadcasting station or a scale marking.

According to the invention the dial may be provided with a covering plate of transparent material having accumulated in it by total reflection light energy which emerges at the points frosted by etching and which correspond to the positions of the station names or other scale indications and in which, in addition, an indicating device for the station received at any particular tuning position or other scale adjustment is distinguished from the other station indications by light of different intensity or color.

In a preferred form of construction of the dial according to the invention the covering plate may be a glass plate having the station names etched on its front surface. On the narrow sides are arranged, for example in the manner of linolite lamps, light sources capable of emitting their light essentially in the plane of the glass plate. By reason of total reflection this light can only emerge at the frosted points so that the station names appear brightly on a dark background. For indicating the station tuned in, the glass plate may have arranged behind it a source of illumination of different intensity or color, which by means of blanking members, only becomes operative for the station name tuned in at any particular time.

The indicating device is, however, preferably constituted by an elongated neon discharge tube which is adapted to shift behind the covering plate relatively to the latter and may be provided with a mask or blanking member. According to the succession of the station names, the movement of the neon tube may be continuous or intermittent. Preferably, the station names are arranged in groups. In this case, the neon indicating tube may be arranged transversely to the covering plate and be provided with a blanking device which is automatically controlled by the longitudinal movement of the tube.

The use of a neon or rare gas discharge tube has in addition the great advantage that this tube can also be used as an indicating device for the exact tuning position so that this tube has its highest luminous intensity at the exact tuning position of the tuning means.

For various wave bands several covering plates of the kind referred to may be provided, the color of the light entering laterally into the glass plates being preferably different for the various wave lengths. With this arrangement, care should be taken that the color of the light of the indicating device is distinguished as far as possible from the light that serves for the lateral illumination of the glass plates.

In order that the invention may be clearly understood and readily carried into effect, one embodiment thereof will now be described more fully by way of example with reference to the accompanying drawing in which, Fig. 1 is a perspective view of apparatus embodying the invention, Fig. 2 is a front view of the neon tube indicator and its movable mask, and Fig. 3 is an end view of the tube and mask of Fig. 2.

Referring to this drawing, a glass plate 1 carries on its obverse or front surface the station names 2 which by etching or sand-blasting are dulled with respect to the other glass surface and which are arranged side by side in several vertical columns. On the ends of the glass plate which may have a thickness of about 1 cm. are arranged in the manner of linolite lamps elongated incandescent lamps 3 radiating their light essentially in the plane of the glass plate towards the latter. By reason of total reflection on the glass walls the light can only emerge at those points at which the glass surface is etched. The station names and other scale markings made by etching consequently appear bright on a dark background.

Instead of using elongated incandescent lamps, use may be made of gas discharge tubes.

The glass plate 1 has arranged behind it a neon discharge tube 4 capable of being moved sidewise in a position transverse to its direction of movement. The tube 4 serves as a tuning indicator and any known means may be utilized for moving it as the tuning means is adjusted. One such simple means is a frame 10 which supports the tube and its mask 8, the frame being connected as by cords 11 or any other known driving means with the shaft (not shown) of the tuning means, such as a condenser. This neon tube has mounted on it a mask or blanking device 5 which, for example by means of a sprocket wheel 6 and a stationary rack 7 mounted on the glass plate or on the dial housing, is controlled by the movement of the neon tube 4 in such constrained manner that during the lateral movement of the neon tube the narrow blanked out light spot of the red light radiating neon tube shifts on it vertically. As shown, the teeth of rack 7 engage those of gear 6 to cause rotation of the latter and movement of the transparent portion 8 of belt 5, in response to adjustment of the tuning means and movement of tube 4 along scale 1. The movement of the blanking member 5 is so adjusted that during the movement of the neon tube along one of the three station columns shown on the figure the light spot has just shifted by the height of the glass plate so that during the further displacement of the neon tube toward the next station column the light spot disappears at the lower edge of the scale and reappears at the upper edge. The blanking member 5 is preferably constituted by an endless belt of opaque material having, for example in the case of three station columns, transparent portions or sections 8 at three points. The particular station name which at any particular time is located before the transparent portion of the blanking member is illuminated in red by the red light spot of the neon tube and contrasts satisfactorily with the other station names which are illuminated, for example, in white. When the neon tube also serves as an indicating device for the correct position of the tuning means, the luminous intensity of the neon tube is greatest at the correct tuning position. Receiver circuits arranged to cause such a neon indicator to glow when the tuning means is adjusted to be resonant to a carrier frequency are known to those skilled in the art and such a circuit, per se, forms no part of my invention. Such a circuit is shown, for example, and the manner of connecting the neon tube thereto in patent to L. J. Perkins, 1,626,480, granted April 26, 1927.

What I claim is:

1. Means for indicating the position of a tuning device comprising in combination, a scale having a plurality of station names marked thereon, a source of white light mounted behind the plane of said station names and arranged to illuminate said names with light of one color, a gaseous discharge tube emitting light of a different color, and means for moving said light along said scale in response to adjustment of said tuning device.

2. Means for indicating the position of a tuning device comprising in combination, a scale formed of transparent material, a plurality of station indicia etched on said scale, a light source arranged at the edge of said scale to illuminate the interior thereof with light of one color, a glow discharge tube emitting light of a different color mounted behind said scale and means for moving said tube transversely of said scale in response to adjustment of said tuning device.

3. The combination defined in the preceding claim in which an opaque member having at least one transparent portion therein is interposed between said discharge tube and said scale.

4. Means for indicating the position of a tuning device comprising in combination, a scale formed of transparent material, a plurality of station indicia etched on said scale, a light source arranged to light the interior of said scale with light of one color, a glow discharge tube emitting light of a different color mounted behind said scale, means for moving said discharge tube transversely of said scale in response to adjustment of said tuning device, a stationary rack, a gear engaging said rack and movable with said discharge tube and a flexible opaque member having a plurality of transparent areas interposed between said discharge tube and scale, said flexible member being operatively connected to said gear.

5. Means for indicating the position of a tuning device comprising in combination, a scale formed of transparent material and having a plurality of groups of station indicia marked on its front surface, a light source mounted at the rear of said front surface and arranged to illuminate all said station indicia with light of one color; a source of light of a different color and which is in marked contrast with the first color, mounted at the rear of said scale and a movable member mounted between said second light source and said scale and mechanically connected to the tuning device and arranged to confine the light from said second light source to a single group of said station indicia.

GUSTAV LEITHÄUSER.